United States Patent [19]
Bronicki et al.

[11] Patent Number: 5,526,646
[45] Date of Patent: Jun. 18, 1996

[54] METHOD OF AND APPARATUS FOR PRODUCING WORK FROM A SOURCE OF HIGH PRESSURE, TWO PHASE GEOTHERMAL FLUID

[75] Inventors: Lucien Y. Bronicki, Yavne; Nadav Amir, Rehovot; Moshe Grassiani, Herzlyia, all of Israel

[73] Assignee: Ormat Industries Ltd., Yavne, Israel

[21] Appl. No.: 279,549

[22] Filed: Jul. 25, 1994

Related U.S. Application Data

[63] Continuation of Ser. No. 41,654, Apr. 1, 1993, abandoned, Ser. No. 955,454, Oct. 2, 1992, abandoned, Ser. No. 955,686, Oct. 2, 1992, abandoned, and Ser. No. 989,918, Dec. 11, 1992, abandoned, which is a continuation of Ser. No. 730,526, Jul. 15, 1991, abandoned, which is a continuation of Ser. No. 444,565, Dec. 1, 1989, abandoned, said Ser. No. 41,654, is a continuation-in-part of Ser. No. 952,156, Sep. 28, 1992, abandoned, which is a continuation of Ser. No. 658,303, Feb. 20, 1991, abandoned.

[51] Int. Cl.⁶ ............................................................ F03G 7/00
[52] U.S. Cl. ............................. 60/641.2; 60/655; 165/45
[58] Field of Search .............................. 60/641.2, 641.4, 60/641.5, 646, 655, 657, 698, 716; 165/45

[56] References Cited

U.S. PATENT DOCUMENTS

| | | | |
|---|---|---|---|
| 4,057,964 | 11/1977 | Hutchinson | 165/45 X |
| 4,102,133 | 7/1978 | Anderson | 60/641.2 |
| 4,776,169 | 10/1988 | Coles, Jr. | 60/641.2 |
| 4,996,846 | 3/1991 | Bronicki | 60/641.2 |

*Primary Examiner*—Stephen F. Husar
*Attorney, Agent, or Firm*—Donald M. Sandler

[57] ABSTRACT

Apparatus for producing from a source of geothermal fluid that contains a mixture of high pressure steam, brine and noncondensable gases includes a heat exchanger for receiving geothermal fluid and transferring heat to water thereby vaporizing the same to produce steam. At least one power plant module is involved, the module having a steam turbine responsive to steam produced by the heat exchanger for producing work, a steam condenser containing an organic fluid and responsive to low pressure steam that exits the steam turbine for condensing the steam into a liquid and vaporizing the organic fluid. The module also contains an organic vapor turbine responsive to vaporizer organic fluid for producing work, and an organic vapor condenser responsive to the low pressure organic fluid that exits the organic vapor turbine condensing the organic vapor to a liquid that is returned to the steam condenser. The cooled geothermal fluid leaving the primary heat exchanger is conducted to a rejection well. Furthermore, an additional heat exchanger also can be provided, there being a first connection associated with both heat exchangers for selectively inserting the additional heat exchanger between the heat exchanger that receives the geothermal fluid and the injection well whereby the operation of the connection means may be coordinated with the operation of the power plant module.

15 Claims, 2 Drawing Sheets

METHOD OF AND APPARATUS FOR PRODUCING WORK FROM A SOURCE OF HIGH PRESSURE, TWO PHASE GEOTHERMAL FLUID

RELATED APPLICATIONS

This application is a continuation of application Ser. No. 08/041,654, filed Apr. 1, 1993 now abandoned, which is a continuation-in-part of Ser. No. 07/952,156, filed Sep. 28, 1992, now abandoned which is a continuation of Ser. No. 07/658,303, filed Feb. 20, 1991, now abandoned; and is a continuation-in-part of Ser. No. 07/989,918, filed Dec. 11, 1992, now abandoned; which is a continuation of Ser. No. 07/730,526, filed Jul. 15, 1991, now abandoned;, which is a continuation of Ser. No. 07/444,565, filed Dec. 1, 1989, now abandoned; and is a continuation-in-part of Ser. No. 07/955,454, filed Oct. 2, 1992, now abandoned; and is a continuation-in-part of Ser. No. 07/955,686, filed Oct. 2, 1992, now abandoned.

TECHNICAL FIELD

This invention relates to a method of and an apparatus for producing work from the source of high pressure, two-phase geothermal fluid.

BACKGROUND ART

Some geothermal sources produce two-phase fluids with a pressure around 800 psia comprising saturated steam, hot brine, and toxic non-condensable gases such as hydrogen sulfide. In order to produce electricity using the hot fluids as an energy source, an arrangement such as that shown and described in the above-identified '156 application can be utilized. In such an arrangement, the geothermal fluid emerging from the ground is separated into two streams: a gaseous stream containing steam and the non-condensable gases; and a liquid stream containing hot, corrosive brine. For reasons of increased reliability and ease in fabrication of components and construction of power plant installations at remote locations near the geothermal source, the power plant is constructed as-a plurality of identical modules each of which includes a steam turbine and an organic vapor turbine directly coupled to a single electric generator.

The gaseous stream at the output of a separator located at the production well is applied, in parallel, to the steam turbines of each module where expansion takes place producing work that is converted by the generator into electricity, with low pressure steam that exits the turbine after expansion takes place being applied to a steam condenser in the module. The steam condenser, which contains liquid organic fluid, such as pentane, functions also as a vaporizer in that the latent heat of condensation of the steam released as the steam condenses, serves to vaporize the organic fluid. Vaporized organic fluid is applied to the organic vapor turbine wherein expansion takes place producing work that is converted by the generator into electricity, the low pressure organic vapor exiting the turbine after expansion takes place being applied to a vapor condenser in the module. Usually, the vapor condenser is air-cooled; and the resultant liquid organic fluid produced passes through a preheater before being returned to the steam condenser. The preheater is also supplied with steam condensate produced by the steam condenser, and the cooled steam condensate is then returned to an injection well.

Because of the large amount of noncondensable gases present in the gaseous stream, the steam condenser is tapped for these gases which are returned with the cooled steam condensate to the injection well. Finally, because the liquid stream produced by the separator is so corrosive, the brine that constitutes the liquid stream is conveyed directly to the injection well without being involved in a heat exchange process.

While this approach works reasonably well in safely containing the non-condensables, and in avoiding the corrosive effects of the brine, the failure to utilize the heat contained in the brine wastes a sizable percentage of the heat contained in the geothermal fluid extracted from the ground. In addition, there are other problems, mainly concerning the large amounts of hydrogen sulfide that are always present in the geothermal fluid. First of all, because separation of the hydrogen sulfide occurs in the steam condenser, wherein the pressure is about one atmosphere, compression of the hydrogen sulfide is required not only to inject the gas into the steam condensate and to force the mixture into the ground, but also to ensure the solubility of the gas in the liquid being injected.

The second problem arising from the presence of hydrogen sulfide in the steam applied to the turbine is the necessity for protecting the turbine blades from corrosion by using a special coating, for example. In addition, both the turbine seals and the compressor seals are not leak proof with the result that some hydrogen sulfide leaks through the seals, a situation that is dangerous to those in the vicinity of the power plant, and detrimental to the environment. Furthermore, the amount of hydrogen sulfide in the geothermal fluid is likely to vary with time, and this places additional mechanical strain on the hydrogen sulfide compressor as the amount of work varies thereby increasing maintenance problems.

In addition to all of these problems, is a problem of safely controlling the two-phase flow in the well in the face of required changes in flow due to power load changes and periodic shut downs for maintenance of the turbines and generator. Rapid changes in the mass flow of a two-phase flow system are difficult to control and involve the risk of blowing out the control valve due to mechanical and thermal shocks introduced into the piping by rapid flow changes.

It is therefore and object of the present invention to provide a new and improved method of and apparatus for producing work from a two-phase, high pressure geothermal fluid which ameliorates the problems described above.

BRIEF DESCRIPTION OF THE INVENTION

The present invention provides a method of and apparatus for producing power from a source of geothermal fluid that contains a mixture of relatively high pressure steam, brine and noncondensable gases. The apparatus includes a heat exchanger which receives the geothermal fluid and which contains water to which heat from the geothermal fluid is transferred thereby vaporizing the water to produce steam. At least one power plant module is involved, the module having a steam turbine responsive to steam produced by the heat exchanger that receives the geothermal fluid for producing work and low pressure steam after the steam expands in the turbine, a steam condenser that contains an organic fluid and is responsive to the low pressure steam that exits the turbine for condensing the low pressure steam into a liquid and vaporizing the organic fluid. The module also contains an organic vapor turbine responsive to vaporized organic fluid for producing work and low pressure organic fluid after expansion in the turbine takes place, and an organic vapor condenser responsive to the low pressure organic fluid that exits the turbine for condensing the low pressure organic fluid to a liquid that is returned to the steam condenser. Furthermore, the steam condensate produced by the steam condenser is returned to the heat exchanger that receives the geothermal fluid for completing a closed water based loop.

The cooled geothermal fluid leaving the heat exchanger that receives the geothermal fluid is conducted to an injection well. Preferably, an additional heat exchanger, which may be air cooled, is also provided. In such a case, there is provided a first connection associated with the heat exchanger that receives the geothermal fluid and the additional heat exchanger for selectively inserting the additional heat exchanger between the heat exchanger that receives the geothermal fluid and the injection well whereby the operation of the first connection means may be coordinated with the operation of the power plant module.

In this manner, cooled geothermal fluid leaving the heat exchanger that receives the geothermal fluid may flow either directly into the injection well or first pass through the additional heat exchanger before entering the injection well. This permits operation of the system of the power plant to take into account the removal of a power plant module from the line for maintenance purposes without interrupting the flow of geothermal fluid from the production well into the injection well. It also permits a module-wide reduction in flow through the turbines to take into account fluctuations in the load being served by the power plant modules.

Preferably, the invention also involves a second connection interposed between the source of geothermal fluid and the additional heat exchanger for selectively connecting the geothermal fluid to the additional heat exchanger. In this manner, the heat exchanger that receives the geothermal fluid can be taken off line by completely shunting it using the second connection without interrupting the flow of geothermal fluid from the production well to the injection well. This eliminates the need for provision of modulation of the flow of the geothermal fluid to take into account maintenance of the various components of the power plant.

The present invention also comprises a method for producing power from a source of geothermal fluid wherein the apparatus is operated in the described manner for producing power.

BRIEF DESCRIPTION OF THE DRAWINGS

An embodiment of the present invention is described by way of example with reference to the accompanying drawings wherein.

DETAILED DESCRIPTION

Figure 1:
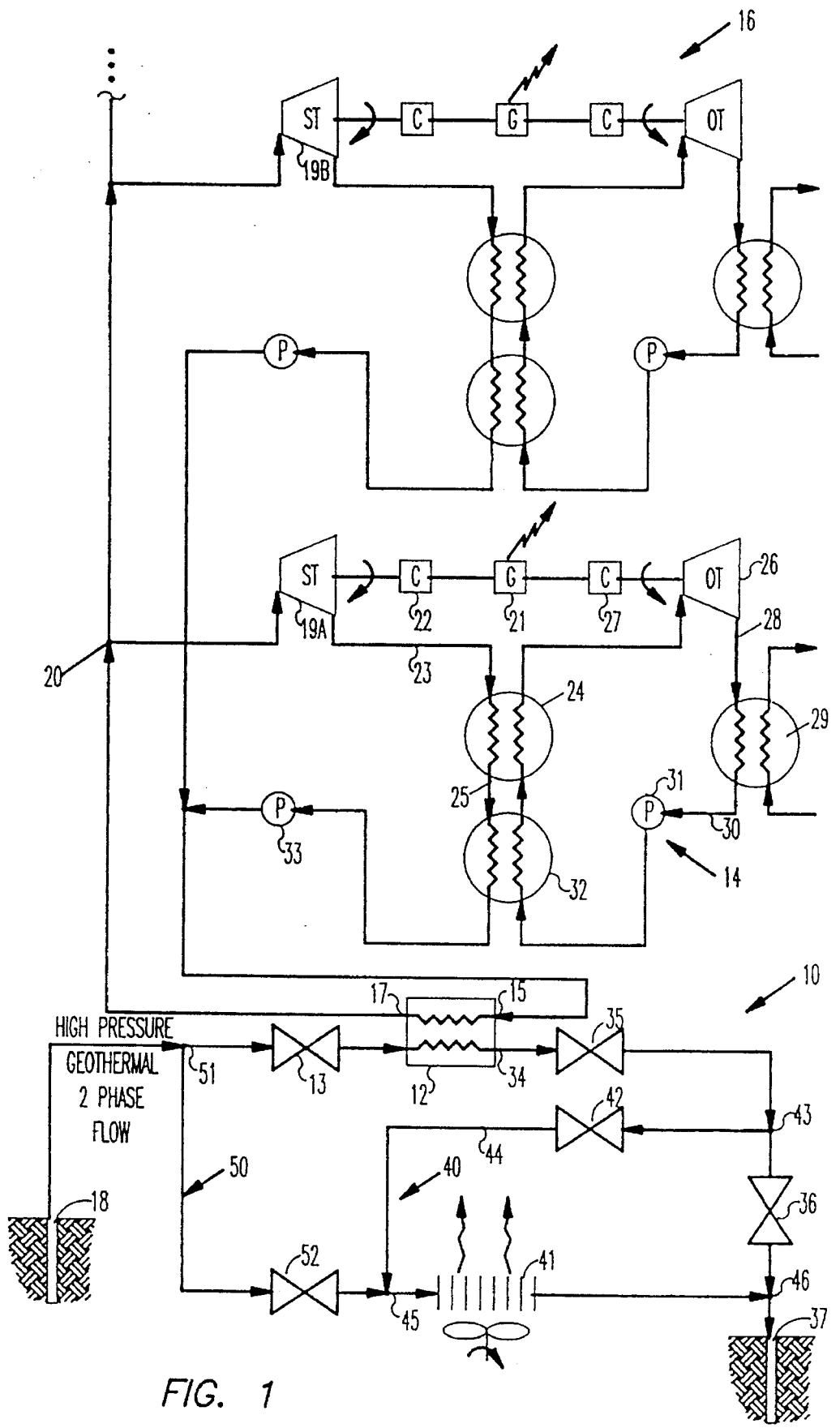
FIG. 1 is a schematic diagram according to the preferred embodiment of the present invention.

Referring now to the drawings, reference numeral 10 designates apparatus for producing work from a source of geothermal fluid that contains a mixture of high pressure steam, brine and noncondensable gases. Apparatus 10 comprises heat exchanger 12 that receives high pressure geothermal fluid and a plurality of power plant modules designated by reference numerals 14 and 16. While two such modules are shown in FIG. 1, it should be understood that a greater number of modules is likely to be provided, in an actual installation, for a given source well 18, which supplies the high pressure geothermal fluid.

High pressure geothermal fluid from production well 18 is applied to heat exchanger 12 through flow control valve 13, the geothermal fluid making indirect contact with and transferring heat to water in the heat exchanger which enters inlet 15 in the heat exchanger wherein vaporization takes place producing steam at outlet 17 of the heat exchanger. Thus, heat exchanger 12 is an indirect heat exchanger. After exiting the heat exchanger at outlet 34, the cooled geothermal fluid preferably passes through serially positioned flow control valves 35 and 36 to injection well 37. As explained below, this flow is not usually modulated in the face of variations in electrical demand, or the numbers of power plants taken off-line for maintenance purposes.

Each of the power plant modules includes a steam turbine, the steam turbine of module 14 being designated by reference numeral 19A and the steam turbine in module 16 being designated by reference numeral 19B. Steam produced at outlet 17 of the heat exchanger is applied in parallel through headers 20 to the inlet of each of steam turbines 19A and 19B.

Inasmuch as each of modules 14 and 16 are identical, the operation of only module 14 is described in detail, it being understood that module 16 operates in the same manner. Steam turbine 19A of module 14 receives steam from heat exchanger 12, and the steam expands in the steam turbine producing shaft work which is applied to generator 21 coupled to turbine 19A by coupling 22 which may be selectively operable. Generator 21 thus delivers electrical power to a grid (not shown) as a consequence of the expansion of steam in turbine 19A.

Low pressure steam that exits turbine 19A after expansion takes place is exhausted through exhaust line 23 and applied to steam condenser 24 which contains an organic fluid, preferably pentane. The organic fluid is responsive to the low pressure steam for condensing the same into a liquid at outlet 25 of the condenser while organic fluid in the condenser is vaporized. The condensate that exits from condenser 24 is applied to preheater 32, and then to pump 33 which pressurizes the steam condensate and return it to inlet 15 of primary heat exchanger 12 thus completing a closed water loop for the module.

The vaporized organic fluid produced by steam condenser 24 is applied to organic turbine 26 wherein expansion of the vaporized organic fluid occurs producing shaft work that is applied to generator 21 through coupling 27 which also may be selectively operable. Low pressure organic fluid that exits turbine 26 through exhaust line 28 connected to the turbine is applied to organic vapor condenser 29 wherein condensation of the organic vapor occurs producing liquid organic fluid in outlet line 30. Pump 31 returns the liquid organic fluid to preheater 32 wherein the heat contained in steam condensate from condenser 24 is transferred to the liquid organic fluid thereby preheating it. The preheated organic fluid is applied to steam condenser 24 to complete the organic fluid loop.

Power plant module 14 thus includes a closed loop for the organic liquid, and forms a part of a closed loop for the steam, this loop being shared by the other power plant modules. Finally, a closed loop exists for the geothermal fluid as well because the geothermal fluid passes from production well 18, through heat exchanger 12, and into injection well 37.

The cooled geothermal liquid that exits heat exchanger 12 at outlet 34 passes through flow control valve 35 and flow control valve 36 into injection well 37. Only a small pressure drop occurs in the loop containing the geothermal fluid; and as a result, no pumping of the geothermal liquid is required in order to return the fluid to the ground through injection well 37 because of the relatively high pressure of the fluid.

In normal operation, valves 13, 35, and 36 are open, and preferably provided valves 42 and 52 are closed. As a result, a predetermined mass flow of geothermal fluid passes through heat exchanger 12 between production well 18 and injection well 37. Latent heat as well as sensible heat, contained in this fluid is transferred in heat exchanger 12 to water contained within the heat exchanger. The water flows at a predetermined rate consistent with extracting the maximum amount of heat from the geothermal fluid. This heat is utilized in a sufficient number of power plant modules in the manner described above. That is to say, each of the steam and organic vapor turbines in the modules operates at rated capacity based on the steam flow available from heat exchanger 12. As a consequence, the total electrical output of the generators of the various modules determines the output of the power plant as determined by the rated mass flow of geothermal fluid through heat exchanger 12.

When one or more of the various power plant modules must be taken off line for maintenance, the practice heretofore, has been to throttle the geothermal fluid introducing shock waves, both thermal and mechanical, into the pipes and valves of the system. These shocks are detrimental to safe operation of these components, and hence to the power plant itself. However, in the present invention, the rated mass flow of geothermal fluid from the production well is independent of the number of power plant modules that are on-line. This is achieved, preferably, by the provision of additional heat exchanger 41 which preferably is air cooled as indicated in FIG. 1, and which is associated with first connection means designated reference numeral 40. First connection means 40 is thus associated with heat exchanger 12 and additional heat exchanger 41 for selectively inserting the additional heat exchanger between the heat exchanger that receives the geothermal fluid and injection well 37 whereby the operation of the first connection means may be coordinated with the operation of the power plant modules. Specifically, first connection means 40 includes flow control valve 42 which is connected to node 43 between the serial connection of flow control valves 35 and 36, and piping 44 which is connected to node 45 between additional heat exchanger 41 and control valve 52. The downstream side of heat exchanger 41 is connected to node 46 between flow control valve 36 and the injection well 37.

In normal operation, as described above, valves 13, 35 and 36 would be open and valves 42 and 52 would be closed so that rated geothermal fluid would flow from source 18 to injection well 37 through the open valves. When one or more of the power plant modules is taken off-line, valves 42, 52 preferably would be opened first, and then valve 36 would be throttled for the purpose of shunting a predetermined portion, or even substantially all, of the geothermal fluid into secondary heat exchanger 41. Such an order of operation ensures that the danger of hammering, damage, and/or even blow-out of the valves is substantially reduced, or even eliminated. Heat exchanger 41 would be effective, under these conditions, to dissipate an effective amount of heat that normally would be utilized by the power plant module taken out of service. Accordingly, the flow rate of steam through the primary heat exchanger would be reduced to take into account the reduction that results when the module is taken out of service. However, no interruption to the flow of geothermal fluid occurs eliminating any problems with mechanical and thermal shock normally associated with throttling the flow of the geothermal fluid.

Figure 2:
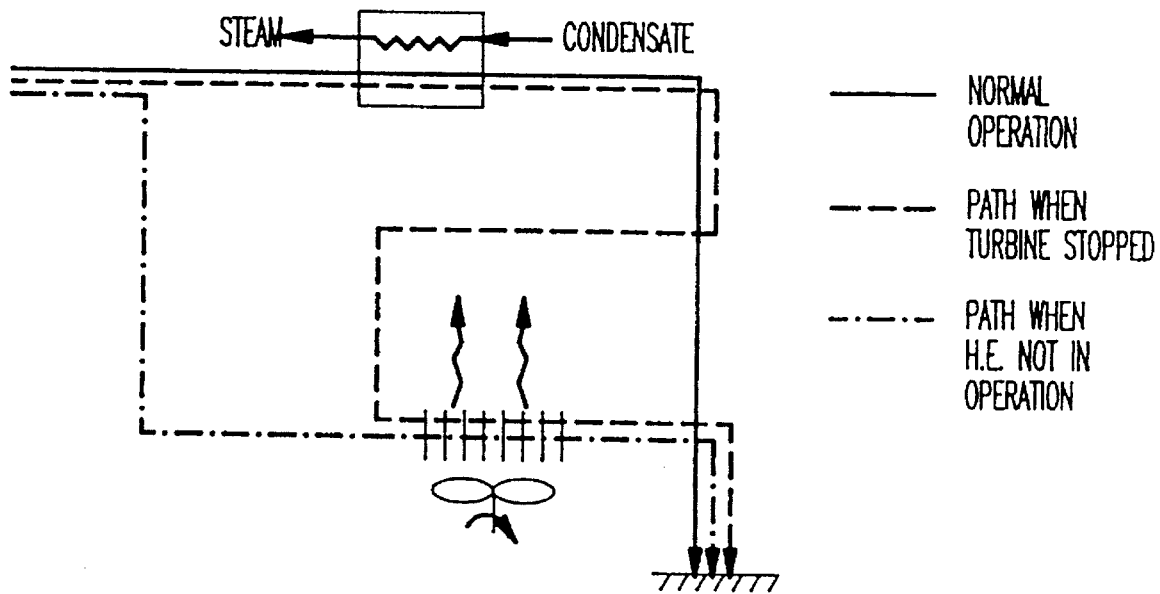
FIG. 2 is a schematic diagram illustrating the selective flow paths through heat exchangers.

To take into account the possibility of taking the heat exchanger 12 itself out of service for maintenance without interrupting the flow of geothermal fluid from production well 18, the present invention also includes second connection means 50 interposed between the source of geothermal fluid, namely production well 18, and the additional heat exchanger 41 for selectively connecting the geothermal fluid to the additional heat exchanger. Accordingly, the secondary connection means 50 includes piping connected between node 51, upstream of control valve 13, and control valve 52, and piping connecting this valve to node 45 located between heat exchanger 41 and valve 42. When heat exchanger 12 must be taken out of service for maintenance purposes, all the power plant modules are first taken off line and valves 42 and 36 are operated in the manner described above, except that valve 36 is gradually closed until all of the flow passes through heat exchanger 41. The flow path of the fluid under these conditions is shown by the broken line in FIG. 2.

Primary heat exchanger 12 may be taken out of service by first opening valve 52 and then closing valve 13 thus completely shunting the primary heat exchanger. In this case the flow path is designated by the chain lines in FIG. 2. In this case also, the additional heat exchanger 41 will dissipate substantially the same amount of heat as would have been dissipated by all of the power plant modules when they are operational.

Additional heat exchanger 41 is preferably air cooled and is provided with a sufficient surface area to dissipate the heat required in order to protect the piping and other components associated with injection well 37. For safety purposes, the additional heat exchanger may be provided with apertured protective sleeves to ensure the ability of the heat exchanger to operate safely and to be available at all times.

Figure 3:
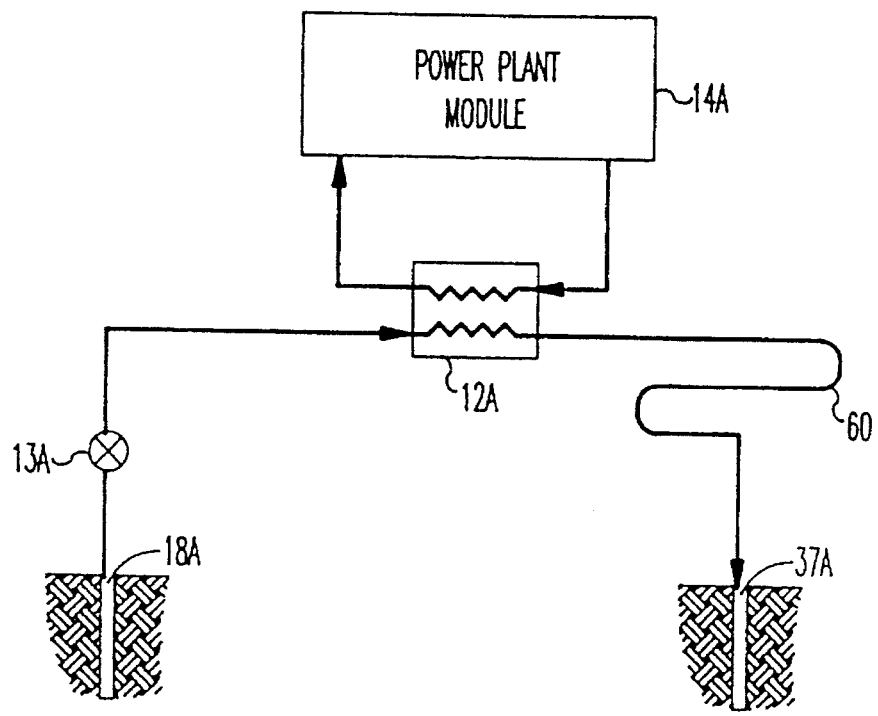
FIG. 3 is a schematic diagram of a further embodiment of the present invention.

A simplified embodiment of the present invention is shown in FIG. 3 as comprising heat exchanger 12A that is similar to heat exchanger 12, and at least one power plant module 14A such as the one designated by reference numeral 14 in FIG. 1. In this case, heat exchanger 12A receives geothermal fluid from production well 18A, and no control valves except for main production well head valve 13A is provided. Consequently, the geothermal fluid will flow continuously through heat exchanger 12A except when main valve 13 at the well head is closed. In this embodiment, the piping includes large expansion loop 60 for connecting the exit of heat exchanger 12A and the inlet of injection well 37A in order to effect the flow of geothermal fluid exiting the heat exchanger to the injection well. In this manner, the geothermal flow remains undisturbed.

In addition, the present invention can be considered a retrofit system for an existing system directly utilizing steam produced from the geothermal fluid similar to the systems disclosed in application Ser. No. 952,156 and Ser. No. 989,918.

Furthermore, if and when needed, treated water can be added to the power cycle water for compensating for possible loss of water to the surrounding environment.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. Apparatus for producing work from a source of geothermal fluid that contains a mixture of high pressure steam, brine, and noncondensable gases, said apparatus comprising:
   (a) a heat exchanger for receiving said geothermal fluid and transferring heat to water thereby vaporizing the same to produce steam;
   (b) at least one power plant module having a steam turbine responsive to said steam for expanding the steam, and producing work and low pressure steam, a steam condenser containing an organic fluid and responsive to said low pressure steam for condensing the same to liquid and for vaporizing the organic fluid and an organic vapor turbine responsive to vaporized organic fluid for producing work and low pressure organic fluid, and an organic vapor condenser responsive to low pressure organic fluid for condensing the same to a liquid that is returned to said steam condenser;
   (c) means for returning liquid produced by said steam condenser to said heat exchanger;
   (d) means for conducting geothermal fluid leaving said heat exchanger to an injection well;
   (e) an additional heat exchanger; and
   (f) first connection means associated with both of the heat exchangers for selectively inserting said additional heat exchanger between the heat exchanger that receives said geothermal fluid and the injection well whereby the flow of geothermal fluid can be divided selectively between both heat exchangers in accordance with the level of operation of said power plant modules.

2. Apparatus according to claim 1 including second connection means interposed between said source of geothermal fluid and said additional heat exchanger for selectively connecting said geothermal fluid to said additional heat exchanger.

3. Apparatus according to claim 2 including means for disconnecting said source from the heat exchanger that receives the geothermal fluid.

4. Apparatus according to claim 3 wherein said additional heat exchanger is air cooled.

5. Apparatus according to claim 3 wherein said steam turbine and organic turbine of said at least one power plant module are each connected to a single electrical generator.

6. Apparatus according to claim 4 wherein said electrical generator is located between said steam turbine and organic turbine.

7. Apparatus according to claim 6 including a means to selectively couple said steam turbine and organic turbine of said at least one power plant module to said electrical generator.

8. Apparatus according to claim 1 including at least one additional power plant module having the same components as said at least one power plant module.

9. Apparatus according to claim 1 wherein said first connection means includes a direct conduit having two serial flow control valves interposed between the outlet of the heat exchanger that receives the geothermal fluid and the injection well, and a bypass conduit connected between the two flow control valves and the inlet of said additional heat exchanger, said bypass conduit including flow control valves.

10. Apparatus according to claim 1 wherein said organic fluid is pentane.

11. A method for producing work from a source of geothermal fluid that contains a mixture of high pressure steam, brine, and noncondensable gases, said method comprising:
   a) applying said geothermal fluid from a production well to an injection well through an indirect contact heat exchanger;
   b) pumping water through said heat exchanger whereby heat is transferred to the water for vaporizing the same into steam;
   c) expanding the steam to produce work;
   d) condensing the expanded steam by vaporizing an organic fluid;
   e) expanding the vaporized organic fluid to produce work;
   f) condensing the expanded vaporized fluid to produce liquid organic fluid;
   g) returning the condensed expanded steam to said heat exchanger; and
   h) maintaining the same flow of geothermal fluid through said heat exchanger independently of the changes in the rate of flow of water through the heat exchanger.

12. Apparatus for use with a source of geothermal fluid, and a source of working fluid, said apparatus comprising:
   a) a primary indirect-contact heat exchanger for receiving said geothermal fluid and said working fluid, and producing vaporized working fluid and cooled geothermal fluid;
   b) means for routing said cooled geothermal fluid to a re-injection well for disposing of said cooled geothermal fluid;
   c) a secondary indirect-contact heat exchanger; and
   d) said means for routing includes first selector means for selectively inserting said secondary heat exchanger between said primary heat exchanger and said re-injection well whereby said geothermal fluid selectively flows either through only said primary heat exchanger, or serially through said primary heat exchanger and said secondary heat exchanger.

13. Apparatus according to claim 12 wherein said means for routing includes second selector means for causing said geothermal fluid to bypass said primary heat exchanger and to thereby cause said geothermal fluid to flow only through said secondary heat exchanger.

14. Apparatus according to claim 13 wherein said working fluid is water.

15. Apparatus according to claim 14 wherein said apparatus includes a power plant responsive to said vaporized working fluid for generating power.

* * * * *